United States Patent [19]

Okamura

[11] Patent Number: 5,089,690

[45] Date of Patent: Feb. 18, 1992

[54] KEYBOARD OVERLAY

[75] Inventor: Mike H. Okamura, Boise, Id.

[73] Assignee: Hewlett-Packard Company, Palo Alto, Calif.

[21] Appl. No.: 628,300

[22] Filed: Dec. 14, 1990

[51] Int. Cl.$^5$ .......................... G06C 7/00; G06C 7/02
[52] U.S. Cl. ........................ 235/145 R; 235/145 A; 235/146
[58] Field of Search ................ 235/145 R, 145 A, 146

[56] References Cited

U.S. PATENT DOCUMENTS 4,032,729  6/1977  Koistinen ...................... 235/145 R Primary Examiner—L. T. Hix
Assistant Examiner—Eddie C. Lee

[57] ABSTRACT

An overlay is described for a keyboard wherein the keyboard includes a plurality of convex, depressible keys that extend above openings in a panel surface, each key having an associated function indication. The overlay comprising a molded plastic, planar member sized to cover substantially the extent of the keyboard, and having both keyboard and user sides. The keyboard side exhibits a plurality of waffle-like convex chambers created by orthogonal intersecting walls, each convex chamber surrounding a corresponding key and having a resilient ceiling member positioned over the key. When the resilient ceiling member is depressed by a user, the underlying key is likewise depressed and actuated. The user side of selected ones of resilient ceiling members, indicate modified key functions.

8 Claims, 1 Drawing Sheet

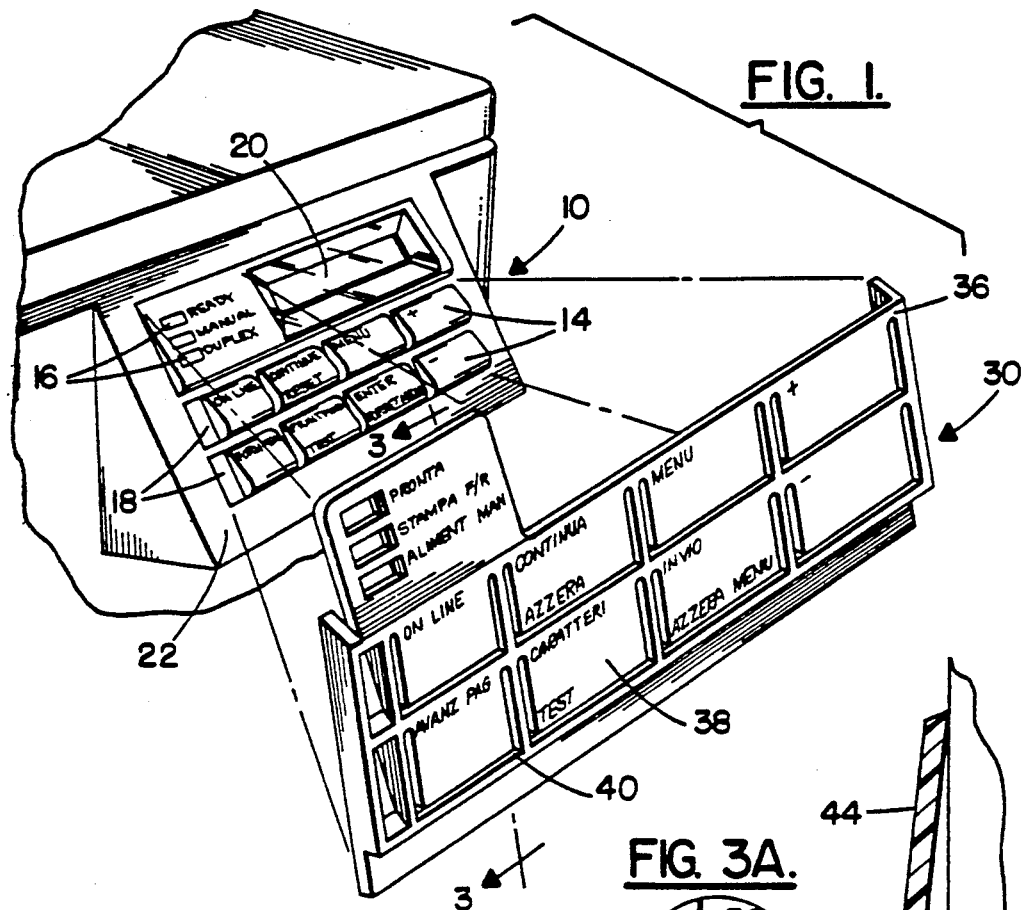
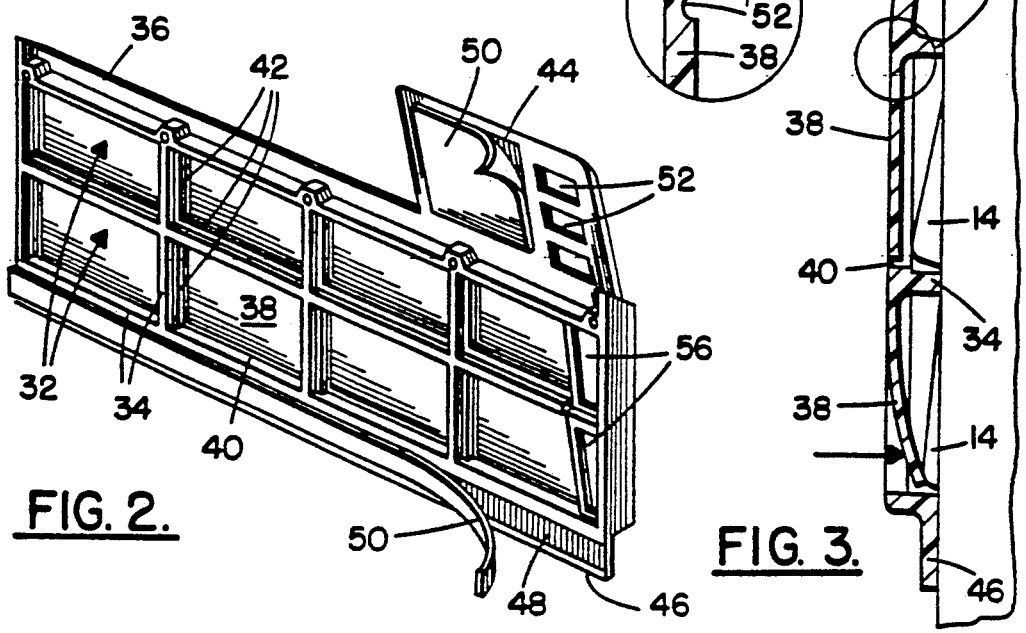

KEYBOARD OVERLAY

FIELD OF THE INVENTION

This invention relates to keyboards for electronic equipment, and more particularly to a keyboard overlay that has built-in keys having modified function indications for underlying keyboard keys.

BACKGROUND OF THE INVENTION

It is common that electronic equipment manufactured for an English speaking market finds its way into non-English speaking markets. When such equipments contain control panels or keyboards with English instructions or indications thereon, manufacturers are often required to install substitute control panels and/or keyboards for the non-English speaking customers.

A keyboard or control panel normally comprises an underlying printed circuit board with a plurality of push-switches mounted thereon. A molded-in key structure is positioned over and attaches to the printed circuit board or the equipment's cabinet. Individual keys of the molded-in key structure are depressible and actuate the underlying push-switches. To accommodate the non-English speaker, the molded-in key structure is removed and replaced by a new key structure having local language function indications printed on the keys. This is both expensive and requires that a variety of part numbers be stocked for the individual markets.

In an attempt to avoid the need to replace the key structures, the prior art has employed thin overlay templates, with the keyboard keys extending through openings in the template. Adjacent to the keys, foreign language indications are placed that indicate key functions. The disadvantages of such templates are that the distances between the keys are often quite narrow, and it is difficult to fit the foreign language indication in the limited available space. Further, it is difficult for the operator to identify which key goes with which template legend.

The prior art has also accommodated this problem by providing key cap labels with the foreign language indications or new key caps with such indications imprinted thereon. The disadvantages of such labelling or replacement caps is that it is time consuming to place the labels on each separate key or to replace the individual caps. It is also costly for the manufacturer to maintain and keep track of an inventory of these parts, especially when there are a multiplicity of language stickers or caps which need to be provided. For instance, it is often the case that ten or more different languages must be accommodated.

Accordingly, it is an object of this invention to provide a keyboard/control panel overlay for foreign market use.

It is another object of this invention to provide a keyboard/control panel overlay that enables key function indications to be quickly and rapidly changed without requiring any changes to the underlying keyboard.

It is still another object of this invention to provide a molded inexpensive keyboard overlay.

SUMMARY OF THE INVENTION

An overlay is described for a keyboard wherein the keyboard includes a plurality of convex, depressible keys that extend above openings in a panel surface, each key having an associated function indication. The overlay comprises a molded, plastic, planar member sized to cover substantially the extent of the keyboard, and having both keyboard and user sides. The keyboard side exhibits a plurality of waffle-like, convex chambers created by orthogonal intersecting walls, each convex chamber surrounding a corresponding key and having a resilient ceiling member positioned over the key. When the resilient ceiling member is depressed by a user, the underlying key is depressed and actuated. The user side of selected ones of resilient ceiling members, indicate modified key functions.

DESCRIPTION OF THE DRAWINGS

FIG. 1 is an exploded, perspective view of a keyboard having an overlay incorporating the invention hereof.

FIG. 2 is a perspective rear view of the overlay of FIG. 1.

FIG. 3 is a sectional view taken along line 3—3 of the overlay shown in FIG. 1.

FIG. 3a is a modification to the attachment point between a depressible resilient member and the overlay frame.

DETAILED DESCRIPTION OF THE INVENTION

Referring now to FIG. 1, a control panel 10 is shown mounted on the exterior of a printer body 12. Control panel 10 contains a plurality of keys 14 which are depressible to provide control functions for printer 12. A plurality of indicator lights 16 and 18, to the left of control panel 10, provide indications concerning the state of operation of printer 12. A display 20 enables a user to see various messages with respect to the control functions assigned to individual keys. Adjacent to each of indicator lights 16 is an English language statement which indicates the meaning of the respective light. Similarly, each of keys 14 has written thereon, a function indication which defines the action performed when the key is depressed. A planar keyboard panel surface 22 surrounds the entire control keyboard structure 10.

To adapt control panel 10 to a foreign market, a molded plastic keyboard overlay 30 is provided. Rear and sectional views of overlay 30 are shown in FIGS. 2 and 3 respectively and will be referred to hereinafter in conjunction with FIG. 1. As can be seen from FIG. 2, the keyboard side of overlay 30 comprises a waffle-like structure including a plurality of convex chambers 32. Each chamber 32 is defined by four intersecting, orthogonal walls 34 that extend down from a planar sheet 36. Each of convex chambers 32 is adjusted so as to mate with a corresponding key 14 on control keyboard 10.

The "ceiling" of each of chambers 32 is comprised of a cantilever section 38. Each cantilever section 38 is separated from the remainder of planar sheet 36 by a continuous slot 40 that surrounds three sides thereof. When keyboard overlay 30 is molded, cantilever sections 38 are preferably made somewhat thinner than sheet member 36 to provide additional flexibility at the cantilever point. Slots 40 are positioned interiorly from walls 34 so that sections 42 of sheet member 36 remain connected to walls 34 and, together, provide the upper extent of the walls with a T shape, for added stiffening and structural support.

Overlay 30 is provided with both upper and lower extensions 44 and 46 which, along with the lowermost edges of walls 34, abut keyboard panel 22 when overlay 30 is emplaced on keyboard 10. An adhesive coating 48 is placed on extensions 44 and 46 and covered, in the normal manner, by a releasable, sheet 50. In addition, a plurality of openings 52 and 56 are molded into overlay 30 to enable underlying indicator lights 16 and 18 to be observed. Overlay 30 is preferably molded from a polycarbonate which is opaque, and has screened on its user side appropriate non-English translations of the underlying English language function indications.

When overlay 30 is put in place over control panel 10, each of keys 14 fits within a mating chamber 32. Assuming that adhesive coversheets 50 have been removed, when overlay 30 is put into place, adhesive layers 48 and 44 adhere to the underlying control panel 22 and thereafter maintain overlay 30 in place. When the user wishes to depress a key, a cantilever section 38 is depressed which, in turn, depresses an underlying key 14.

As shown in FIG. 3a, if it is desired that thicker cantilever sections 38 be employed, a necked-down portion 52 can be provided in the molded structure to enable the desired flexibility to be obtained at the intersection between a cantilever section 38 and sheet member 36.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A removable overlay for a user-operable keyboard, said keyboard including a plurality of convex, depressible keys that extend above a panel surface, each said kay having an associated indication of the key's function, said overlay comprising:
   a molded, plastic, planar member sized to cover substantially the extend of said keyboard, said planar member having keyboard and user sides, said keyboard side exhibiting a plurality of convex chambers created by orthogonal intersecting walls, each said convex chamber sized to surround and mate with a said convex key and having a resilient ceiling member positioned over said key, so that when said resilient ceiling member is depressed, said key is likewise depressed and actuated, the user side of selected ones of said resilient ceiling members having modified key function indications, whereby user selection of a said removable overlay having said modified key function indications and emplacement thereof over said keyboard enables said user to comprehend functions performed by said keys.

2. The overlay as recited in claim 1 wherein said planar member further comprises a planar sheet from which said walls extend in the direction of said keyboard side, each said resilient ceiling member being a section of said planar sheet member, but separated therefrom by a slot running along three of four sides of each chamber, so that a fourth side of each said section remains integral with said planar sheet and serves as a hinge for said section.

3. The overlay as recited in claim 2 wherein said sections are of lesser thickness than said planar sheet.

4. The overlay as recited in claim 2 wherein said fourth side of each said section, where it joins with said planar sheet, exhibits a lesser thickness so as to facilitate bending of said section.

5. The overlay as recited in claim 3 wherein said overlay has extensions that abut said panel surface when said overlay is in place on said keyboard, each extension having an adhesive layer that bonds to said panel surface to maintain said overlay in place.

6. The overlay as recited in claim 3 wherein the slots that define said sections are spaced from the walls of said chambers to leave portions of said planar sheet extending to either side of said walls, whereby said walls are stiffened by said remaining planar sheet portions.

7. The overlay as recited in claim 2 wherein said overlay is opaque and has orifices formed therein to enable underlying indicator lights to be viewed.

8. The overlay as recited in claim 7 wherein certain of said modified key function indications are in a non-English language.

* * * * *